United States Patent [19]
Stringari

[11] Patent Number: 5,915,808
[45] Date of Patent: *Jun. 29, 1999

[54] POWER SAW GUIDE KIT

[76] Inventor: Frank L. Stringari, 3829 Alabama St., San Diego, Calif. 92104

[ * ] Notice: This patent issued on a continued prosecution application filed under 37 CFR 1.53(d), and is subject to the twenty year patent term provisions of 35 U.S.C. 154(a)(2).

[21] Appl. No.: 08/535,352

[22] Filed: Sep. 28, 1995

[51] Int. Cl.6 .................................................... B27B 9/04
[52] U.S. Cl. .............................. 33/474; 33/427; 33/484; 33/630; 33/640; 83/745
[58] Field of Search ............................. 33/419, 427, 429, 33/474, 478, 480, 484, 485, 486, 625, 628, 630, 640; 83/745, 471.2

[56] References Cited

U.S. PATENT DOCUMENTS

| | | |
|---|---|---|
| 1,246,768 | 11/1917 | Michie ........................................ 33/419 |
| 2,772,707 | 12/1956 | Leino ........................................... 33/427 |
| 3,296,702 | 1/1967 | Feddish ........................................ 33/427 |
| 3,751,816 | 8/1973 | Hayes . | 
| 4,054,077 | 10/1977 | Gram ............................................ 83/745 |
| 4,056,028 | 11/1977 | Patterson ..................................... 83/745 |
| 4,843,728 | 7/1989 | Francis ........................................ 33/640 |
| 4,961,360 | 10/1990 | Peel et al. ................................... 83/745 |
| 5,226,345 | 7/1993 | Gamble ....................................... 83/745 |

*Primary Examiner*—Christopher W. Fulton
*Attorney, Agent, or Firm*—Fitch, Even, Tabin & Flannery

[57] ABSTRACT

A combination carpenter's square and saw guide, and a conversion kit for converting an existing carpenter's square to such combination, utilizes a standard L-shaped square with a channel mounted on each leg of the square and extended in the same direction so that the channels are each extended in the X or Y direction and are on opposite faces of the flat carpenter's square. A rod is axially slidably inserted into each channel, and the distal end of the rod is extended out beyond the corner of the square a distance equal to the distance between the sole plate of a circular hand saw and the plane of the blade, and fixed in this position. The resulting tool is a carpenter's square which also acts as a convenient saw guide, as the workman can back off the square until the tip of the rod aligns with a pencil mark made at the cut line, and use the square for a saw fence. In kit form, a jig is used to produce appropriate bolt holes in the square and the channels which will accommodate either left- or right-handed construction.

4 Claims, 3 Drawing Sheets

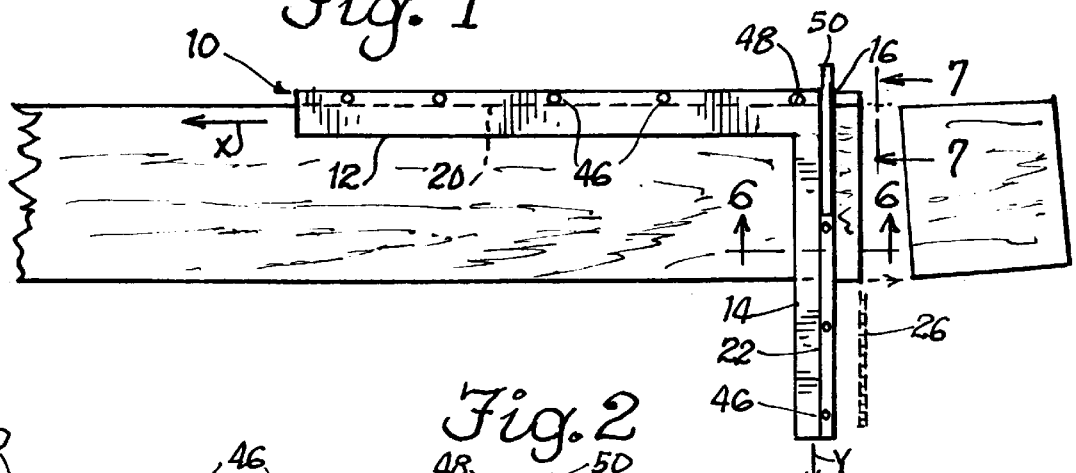
Fig. 1
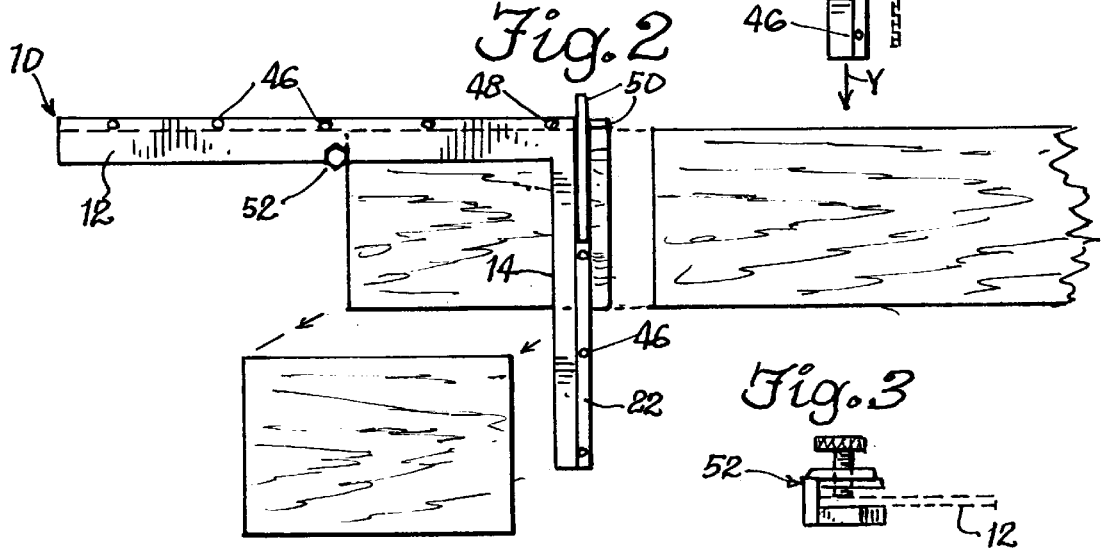
Fig. 2
Fig. 3
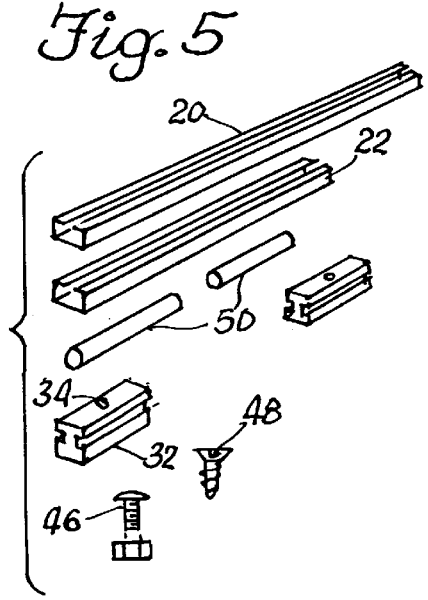
Fig. 5
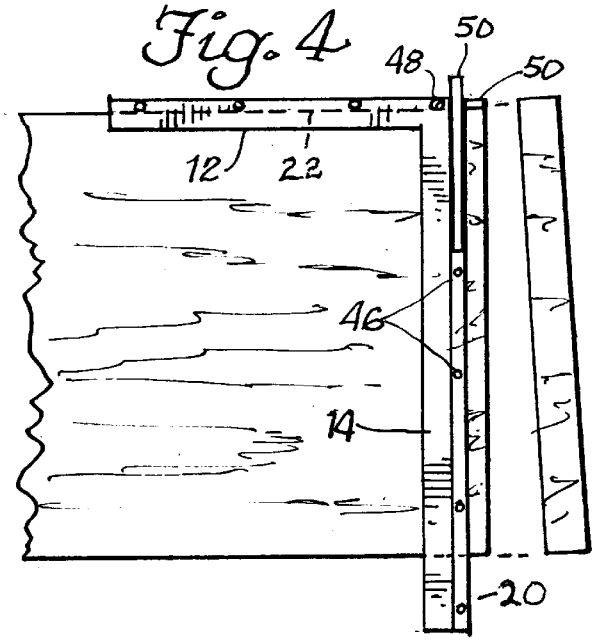
Fig. 4

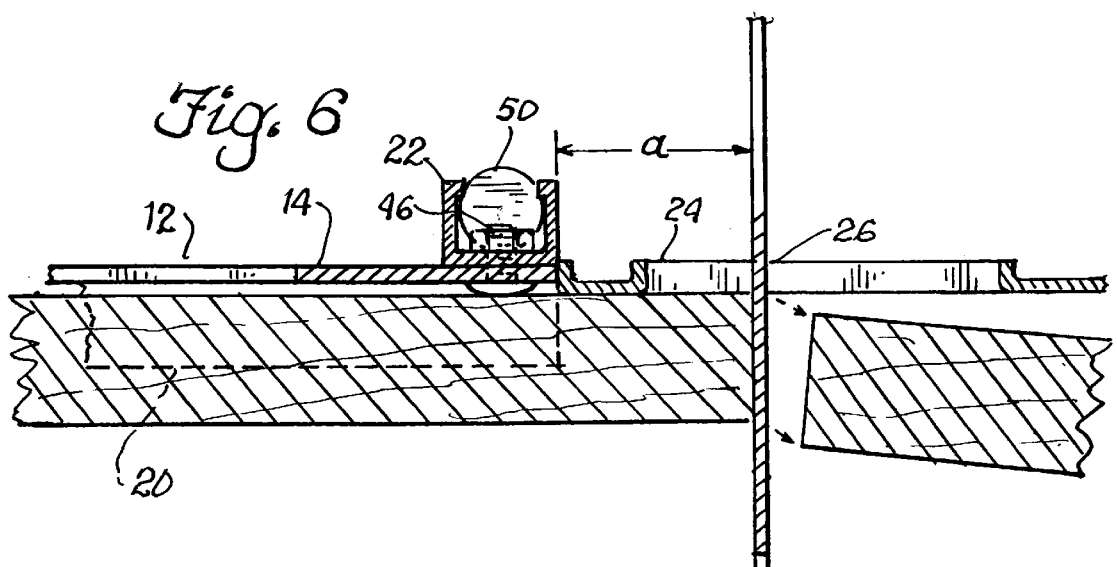
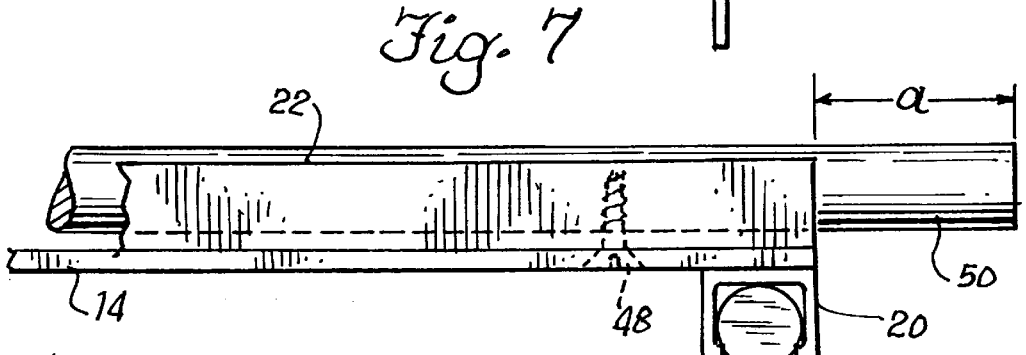
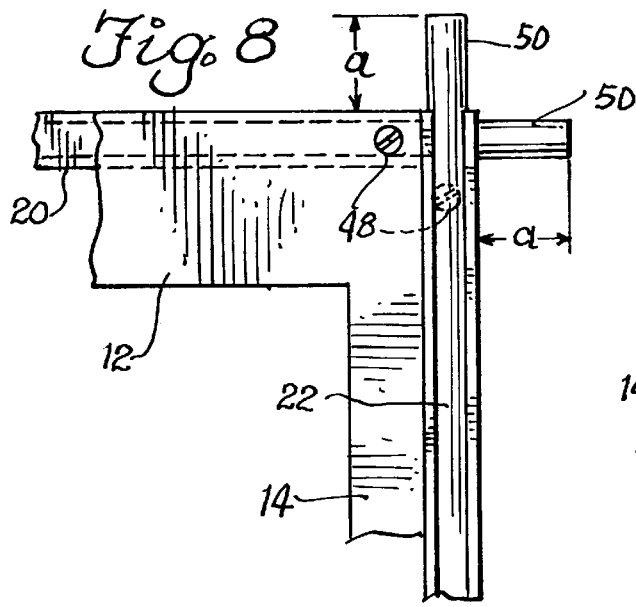
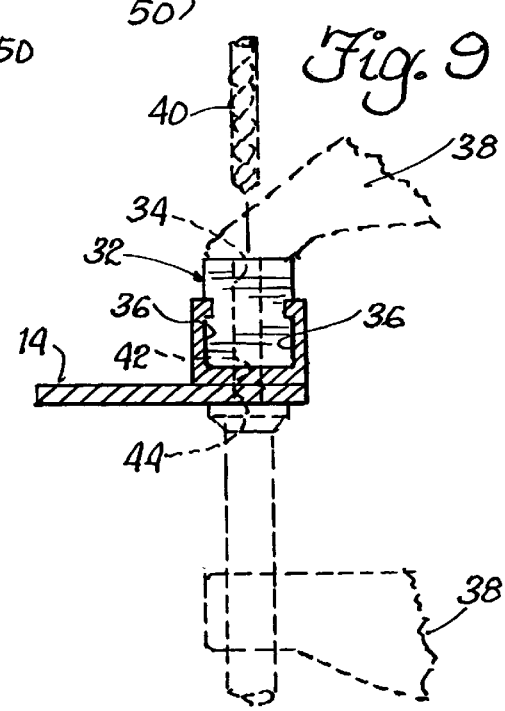

POWER SAW GUIDE KIT

BACKGROUND OF THE INVENTION

In the field of carpentry accessories, there are complex and unwieldy devices intended to help in one way or another to establish right angles and miter cuts, spaced parallel cuts, and so forth. Some of these are designed to replace existing, simpler structures, and others add additional tools that must be and carried on-site by the carpenter. A tool must be simple, lightweight and compact to be accepted by the trade since the tradesman can already do anything he needs to do, with the tools he already has. Tools that replace an existing tool and eliminate one or more small inconvenience from the job without adding pounds or cubic inches to the tool mass, have a chance of success.

One such minor annoyance arises when one needs to cut off an orthogonal length of a plank. Traditionally the way this is done is by laying the flat carpenter's square on the plank with one leg along the length of the board and the other leg laying across the board, and making a transverse pencil line across the whole run of the cut-off path. Then a saw, usually the hand-held circular saw used extensively by framing carpenters and the like, is used to follow the line across the board.

The line is often difficult to follow as it may not have been well lit in the first place, and continued sawdust accumulation along the cut line, and vibration, obscure the pencil mark. The saw blade safety cover also obstructs the cut line, making it difficult to see either the pencil line or the blade at its intersection with the board, and hard to be sure the blade path is true to the line. This results in undercuts, overcuts, and angled cuts that were supposed to have been orthogonal. On outdoor jobs which rely on sunshine for light, as dusk approaches the mistakes proliferate. It becomes increasingly difficult to insure the alignment of the rotating blade and the pencil mark in the flurry of sawdust under the spring-loaded blade guard.

Because right angularity is built into the carpenter's saw, and the distance between the sole plate of the saw and the plane of the blade is constant, one would think that there would be a more efficient way of making such saw cuts, and in fact the prior art has developed several devices which are used to establish the angle automatically and enable the saw to be merely moved across the fence or the like to make the cut. Typically these devices may be heavy and stationary, or complicated by the addition of a number of other functions. A simple device that is integral with the existing carpenter's square, and that would accommodate both left-space and right-space handed carpenters, enabling saw cuts to be made on either leg of the square without visual reference to a pencil line, would be a welcome addition to the options of the carpenter.

SUMMARY OF THE INVENTION

The instant invention supplies the above-stated need. It is based on the square that the carpenter already owns, and in its kit form, which is the most easily described, it comprises a pair of elongated open channels and a slidable rod in each of the channels with a set screw in the channel to fix the rod at a selected length of extension from the end of the channel.

The kit includes means to mount each channel on one of the legs of the carpenter's square so that the two channels are not only on opposite legs, but on opposite faces of the flat sheet metal that characterizes carpenter's squares.

Each of the rods is extended out beyond the corner where the two legs join, a distance equal to the spacing between the sole plate of the saw which typically it rides on the fence, and the cutting plane of the rotating blade.

Now all the carpenter has to do is to make a mark on a board edge indicating where the right angle cut should be made, and align the distal end of the respective rod with the check mark, and, using the carpenter's square itself as the saw fence, draw the saw across the board, where it makes an even orthogonal cut right at the tip of the respective rod extending from the channel. Provided the rod tip is at the cut-off check mark, there is no doubt that the cut will be at the right place, and the use of the carpenter's square as the saw guide insurers orthogonality of the cut. There is no need to try to see past the safety guide, and no (or at least less) temptation to remove it.

Structure is also provided in the kit to ensure that the mounting of the channels on the square can be done to accommodate both left and right handed carpenters.

BRIEF DESCRIPTION OF THE DRAWINGS

FIG. 1 is a top elevation view illustrating a plank being cross-cut using the guide square;

FIG. 2 illustrates in top plan view the square used in another manner with a stop, on the piece that is being cut off of the plank to make a number of cut-off board lengths of the same size;

FIG. 3 illustrates the clamp screw stop used in FIG. 2;

FIG. 4 illustrates the carpenter's square with the channels and rods in place, using the longer leg of the tool to cut plywood and other wide stock;

FIG. 5 illustrates the complete kit used for converting an existing carpenter's square to the combination saw guide and square;

FIG. 6 is a view as seen from line 6—6 of FIG. 1;

FIG. 7 illustrates the tool by itself, removed from the board, configured for right handed carpenters;

FIG. 8 is a fragmentary top plan view of the corner of the apparatus where the carpenter's square legs meet illustrating the manner in which the dimension "a" is taken;

FIG. 9 illustrates use of the drill jigs of the conversion kit in creating the combination tool from an existing carpenter's square.

DETAILED DESCRIPTION OF THE PREFERRED EMBODIMENT

Figure 10:
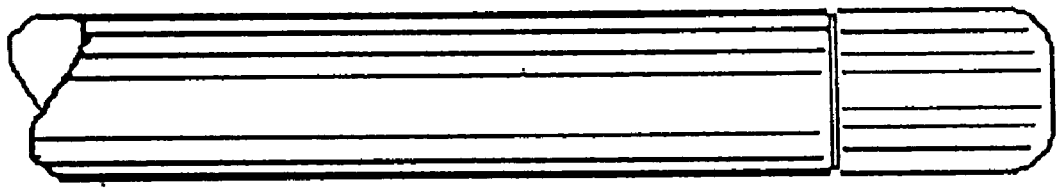
FIG. 10 is an elevation view of a fragmentary portion of the dowel, showing a modification in which a brightly colored plastic cap is slipped over a reduced diameter dowel tip for enhanced viability.

The carpenter's square 10 is typical of all such squares and comprises approximately eight eighth-inch thick planar steel in an L-shape, such that it has a short leg 14 and a long leg 12 which meet orthogonally at the corner 16 and together define directions "X" and "Y".

The parts that are added on to the carpenter's square to make it into the combination tool are best understood by inspecting FIG. 5, which illustrates the kit form of the invention, sold to convert an existing carpenter's square. Two channels 20 and 22 are identical except in length, which corresponds to the lengths of the leg. These channels act as fences or guides for the sole plate 24 of the saw. For this reason the channels are mounted flush with the outer edges of the respective legs.

It will be noted from all of the figures, FIG. 1 being most representative, that the carpenter's square in the drawings is a traditional flat steel square, having a front face toward the viewer, and an opposite face on the other side of the sheet metal. One of the channels is mounted to each of these faces, so when viewed from the top as in FIG. 1 only one channel can be seen at a time. The arrangement of FIG. 1 is provided for a right-handed carpenter. This is typically the manner in which the right-handed carpenter cuts lengths from a plank. With his left hand, he holds the long leg 12 in the orientation shown in FIG. 1, using the right hand to engage the saw. When cutting a board that was too wide for the short leg, it can be flipped the other way, such that the channel on the long leg would be upwardly directed for a right-handed carpenter. Reversing the face to which each of the channels is mounted creates a left-handed square/guide.

In order for the same set of channels to be used for left or right handed carpenters, the channels must be arranged so that they are mounted flush with the outer edges of their respective legs irrespective of which side mounts the channels. If the channels are mounted with screws, the easiest way to do this is to ensure that the screw holes through the channels are centered between the sidewalls of the channels exactly, so that either sidewall of the channel can be aligned with the outer edge of the respective leg and the screw holes still align with those in the square. To this end, one or more small drill jigs 34 are included in the kit. These jigs slide into the channels as shown in FIG. 9, positioning the central bore 34 exactly between the sidewalls 36 of the respective channels. The channel and the square are overlaid as indicated in FIG. 9 in order to drill the holes to insure proper alignment. The drill jig is secured with "C" clamp 38 while the drill 40 passes through the jig bore 34, creating perfectly aligned and perfectly orthogonal bore holes 42 and 44 respectively, in the channel and the square. Short bolts 46, which have very flat heads, so as not to interfere with the action of the square, mount the channels to the square. The heads of the bolts can be seen in FIG. 4.

The bolt hole on each leg that is the closest to the vertex or corner 16 is not used for the bolt 46. It is used for the flat head set screws 48, one of which is shown in FIG. 7, which pass into each channel at one spot only to fix the rods or dowels 50 against axial movement. This is done after the dowel is set so that it extends from the "fence" defined by the other channel at the vertex, a distance equal to the distance "a" between the surface of the sole plate that rides against the fence, and the near plane of the saw blade 26 which defines the board cut line.

Alternatively, the dowel can be extended out of the channel a distance that exceeds distance "a", and the first cut will automatically trim the rod to the proper length. This will likely leave a raggety distal dowel tip however, so the first method is preferred. Also preferred is a brightly colored plastic cap 54 shown in FIG. 10, which covers the distal tip of the dowel 50. The plastic cap has the same outside diameter as the wooden portion of the dowel and slides freely in the channel. In the aforementioned visual obscurity that often surrounds the work piece, the brightly colored tip greatly eases aligning the dowel tip with a pencil mark.

Each dowel is permanently mounted in its respective channel, on opposite surfaces of the carpenter's square. The mount is "permanent" only because the distance between the sole plate and the saw blade does not vary for one particular saw. The dowels can be adjusted for use with other saws, however.

Once installed in this fashion, cuts can be made with the long or the short leg of the square using the channel on the opposite leg as the saw fence. The tool can be flipped over, as shown between FIGS. 1 and 4, to use the long leg rather than the short leg. Thus, there are only two limitations on the use of the tool once it has been set: (1) without further adjustment, it can only be used for the saw from which the "a" dimension was taken; and (2) without dismantling and reassembling the tool, it cannot be conveniently switched between left- and right-handed users.

The only other manner which the saw combination is used is shown in FIG. 2. In normal use, shown in FIG. 1, the carpenter and the carpenter's square remain with the main part of the board, with the end piece being cut off and falling away. However, if one needs to cut a series of fifteen-inch lengths from a board, the easiest way to do it is to set the square up for the first cut, but before it is made, clamp the screw stop 52 onto the square as shown in FIG. 2, so that it is aligned with the far end of the length to be cut. With the stop in place, the square can be rapidly, sequentially moved up into place with the next length being cut, automatically the same size as the prior length as the stops hits the fresh-cut end of the board. Using the tool in this fashion, a carpenter can produce board lengths that are identical in size, from 1"×X" stock at the rate of about twenty per minute.

The added ease of making such cuts adds little to the weight and volume of the carpenter's square, and the additional parts cost is minimal, so that the expense is insignificant. Thus, the conversion produces substantial advantages without any of the usual tradeoffs of cost, weight, bulk, reliability, complexity, etc. and should find ready acceptance in at least a corner of the trade.

It is hereby claimed:

1. A guide square assembly kit for use with a power saw having a sole plate with a fence-following surface spaced a set distance from a sawing plane of said power saw, comprising:

A carpenters square defining two mutually orthogonal legs to define an "L"-shape;

means for detachably securing one or two extension rods to one or two legs of the carpenters square so that a tip of the extension rod extends from said carpenters square in one of two mutually orthogonal directions aligned respectively with said two mutually orthogonal legs, said rods initially having a length that exceeds said set distance, and said rod being made from a material that can readily be cut by a means for cutting operating within the sawing plane of the power saw;

means for cutting the one or two extension rods so that a tip thereof extends from the fence-following surface a distance that is equal to said set distance, whereby the tip of the one or two extension rods thereafter precisely locates the position of the sawing plane relative to the fence-following surface;

said means for detachably securing each of one or two rods to one or two of the two legs of the carpenters square comprising:

one or two open U-channels that are detachably attached along an edge of one or two of the legs of said carpenters square, whereby one or two extension rods can be placed in the one or two of U-channels and extended past one or two ends of the U-channels until it exceeds said set distance, locking means for securely holding the one or two extension rods in a set position within each respective U-channel; and a slideably engageable I-shaped hole-drilling jig capable of fitting snugly within the one or two U-channels for directing drilling into the U-channels.

2. The guide square as set forth in claim 1 wherein said one or two extension rods are made from wood.

3. The guide square as set forth in claim 2 wherein said one or two extension rods comprise a dowel.

4. The guide square as set forth in claim 1 wherein the tip of said one or two extension rods after they are cut to said set distance are colored with a bright color.

* * * * *